(12) United States Patent
Khatuntsev

(10) Patent No.: US 11,644,548 B2
(45) Date of Patent: May 9, 2023

(54) LASER MEASURING SYSTEM

(71) Applicant: Topcon Positioning Systems, Inc., Livermore, CA (US)

(72) Inventor: Nikolay V. Khatuntsev, Pleasanton, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 841 days.

(21) Appl. No.: 16/665,118

(22) Filed: Oct. 28, 2019

(65) Prior Publication Data

US 2021/0124026 A1 Apr. 29, 2021

(51) Int. Cl.
| | |
|---|---|
| *G01S 7/486* | (2020.01) |
| *G01S 17/10* | (2020.01) |
| *G01S 7/4861* | (2020.01) |
| *G01S 3/04* | (2006.01) |
| *G01S 17/875* | (2020.01) |

(52) U.S. Cl.
CPC ............ *G01S 7/4861* (2013.01); *G01S 3/043* (2013.01); *G01S 17/10* (2013.01); *G01S 17/875* (2013.01)

(58) Field of Classification Search
CPC ........ G01S 7/4861; G01S 17/10; G01S 3/043; G01S 17/875; G01S 7/003; G01S 5/16; G01S 1/70; G01S 17/42; G01C 15/006
USPC ......................................................... 356/5.01
See application file for complete search history.

(56) References Cited

U.S. PATENT DOCUMENTS

| | | | | |
|---|---|---|---|---|
| 4,368,982 A | * | 1/1983 | Van Arnam | G01N 21/55 250/559.01 |
| 4,820,041 A | | 4/1989 | Davidson et al. | |
| 5,100,229 A | | 3/1992 | Lundberg et al. | |
| (Continued) | | | | |

FOREIGN PATENT DOCUMENTS

| | | |
|---|---|---|
| EP | 3436843 A1 | 2/2019 |
| JP | S61-26813 A | 2/1986 |
| JP | H10-47961 A | 2/1998 |

OTHER PUBLICATIONS

International Search Report and Written Opinion dated Nov. 13, 2020, in connection with International Patent Application No. PCT/US2020/050024, filed Sep. 9, 2020, 12 pgs.

(Continued)

*Primary Examiner* — Daniel L Murphy
(74) *Attorney, Agent, or Firm* — Chiesa Shahinian & Giantomasi PC

(57) ABSTRACT

A laser measuring system comprising a laser transmitter and a laser receiver is provided. The laser transmitter includes one or more laser sources for projecting an initial laser pulse and a reflective surface. The laser receiver includes a first reflective surface for reflecting the initial laser pulse to provide a first reflected laser pulse, and a second reflective surface for reflecting the initial laser pulse to provide a second reflected laser pulse. The laser receiver further includes a photo detection unit for receiving 1) a first double reflected laser pulse produced by the first reflected laser pulse reflecting off the reflective surface of the laser transmitter, and 2) a second double reflected laser pulse produced by the second reflected laser pulse reflecting off the reflective surface of the laser transmitter. The laser receiver determines an orientation angle associated with the laser receiver based on the first and second double reflected laser pulse.

24 Claims, 17 Drawing Sheets

(56) References Cited

U.S. PATENT DOCUMENTS

| | | | |
|---|---|---|---|
| 5,771,978 | A | 6/1998 | Davidson et al. |
| 7,196,302 | B2 | 3/2007 | Ohtomo et al. |
| 10,145,671 | B2 | 12/2018 | Khatuntsev |
| 10,371,935 | B1 | 8/2019 | Patel |
| 10,921,430 | B2 | 2/2021 | Ohtomo et al. |
| 2008/0244920 | A1 | 10/2008 | Stegmaier |
| 2012/0198711 | A1 | 8/2012 | Hayes |
| 2014/0360031 | A1 | 12/2014 | Kahlow |
| 2019/0063922 | A1* | 2/2019 | Ohtomo .................. G01C 3/08 |
| 2021/0124026 | A1 | 4/2021 | Khatuntsev |

OTHER PUBLICATIONS

Notice of Allowance dated Oct. 24, 2022 in connection with U.S. Appl. No. 16/710,090, filed Dec. 11, 2019, 16 pgs.
Non-Final Rejection dated May 19, 2022, in connection with U.S. Appl. No. 16/710,090, filed Dec. 11, 2019, 16 pgs.

* cited by examiner

| Demodulated Phase | Carrier (4x) | Subcarrier (20x) | Coarse Angle (4x of A/4) | Precise Angle (20x of A) |
|---|---|---|---|---|
| P1 | +1 | +3 | +1 | +1 |
| P2 | +1 | +1 | -1 | -3 |
| P3 | +1 | -1 | -1 | +3 |
| P4 | +1 | -3 | +1 | -1 |

| Demodulated Phase | Carrier (4x) | Subcarrier (10x) | Chan A (4x) | Chan B (10x) | Chan C (20x) |
|---|---|---|---|---|---|
| P1 | +1 | +2 | +1 | -1 | +1 |
| P2 | +1 | +1 | -1 | +2 | +1 |
| P3 | +1 | 0 | 0 | 0 | -4 |
| P4 | +1 | -1 | -1 | -2 | +1 |
| P5 | +1 | -2 | +1 | +1 | +1 |

| Demodulated Phase | Carrier (6x) | Subcarrier (70x) | Chan A (28x) | Chan B (4x) | Chan C (20x) | Chan D (12x) |
|---|---|---|---|---|---|---|
| P1 | +1 | +5 | -2 | -1 | 0 | +1 |
| P2 | +1 | +3 | +3 | +1 | +1 | +1 |
| P3 | +1 | +1 | +1 | 0 | -3 | -2 |
| P4 | +1 | -1 | -1 | 0 | +3 | -2 |
| P5 | +1 | -3 | -3 | +1 | -1 | +1 |
| P6 | +1 | -5 | +2 | -1 | 0 | +1 |

Receive and reflect an initial laser pulse from a laser transmitter by a first reflective surface of a laser receiver to produce a first reflected laser pulse
1202

Detect a first double reflected laser pulse at the photo detection unit of the laser receiver
1204

Detect the initial laser pulse at a photo detection unit of the laser receiver
1206

Receive and reflect the initial laser pulse by a second reflective surface of the laser receiver to produce a second reflected laser pulse
1208

Detect a second double reflected laser pulse at the photo detection unit of the laser receiver
1210

Determine an azimuth angle associated with the laser receiver based on the first double reflected laser pulse and the second double reflected laser pulse
1212

Determine a 3D position associated with the laser receiver
1214

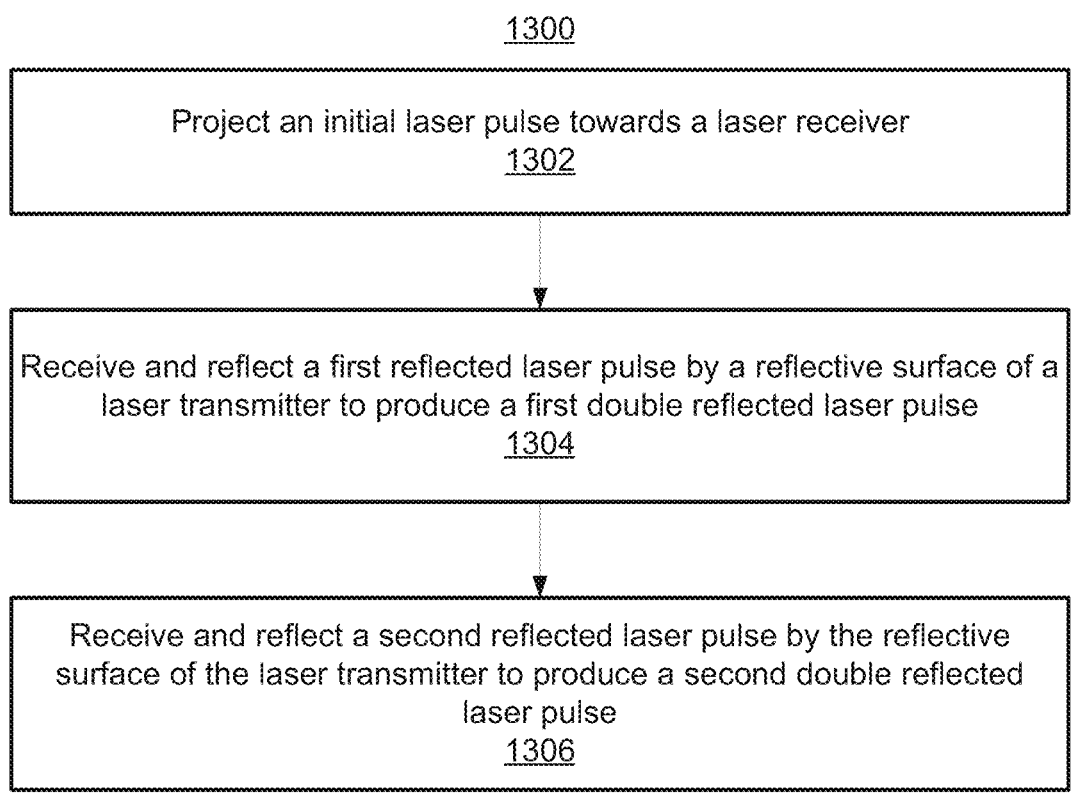

LASER MEASURING SYSTEM

TECHNICAL FIELD

The present invention relates generally to a laser measuring system, and more particularly to a laser measuring system for providing full position and in some embodiments orientation information associated with a laser receiver.

BACKGROUND

Preparation of worksites, such as, e.g., construction and agricultural worksites, typically involves grading and excavating portions of the worksite into desired topologies. Positional measuring is an important aspect in worksite preparation in order to improve the accuracy of such grading and excavating. Laser measuring systems are commonly used by construction machines (e.g., dozers, scrapers, excavators, etc.) to facilitate positional measuring.

In one conventional approach, a laser measuring system is utilized to facilitate positional measuring. In such a conventional laser measuring system, a laser diode of a laser transmitter projects laser pulses and a photo diode of a laser receiver receives the laser pulses. The laser transmitter and the laser receiver are each provided with a reflective surface centered around the laser diode and the photo diode, respectively. Based on the reflections of the laser pulses on the reflective surfaces, the distance between the laser transmitter and the laser receiver can be calculated. However, when the laser transmitter is close to the laser receiver, it is difficult to distinguish between a direct laser pulse and a reflected laser pulse for calculating the distance between the laser transmitter and the laser receiver. Additionally, such a conventional laser measurement system does not provide orientation information of the laser receiver.

One example of a conventional laser measurement system is described in U.S. Pat. No. 10,145,671, issued Dec. 4, 2018, the disclosure of which is incorporated herein by reference in its entirety.

BRIEF SUMMARY OF THE INVENTION

In accordance with one or more embodiments, systems and methods for operating a laser receiver for measuring position and/or orientation of the laser receiver are provided. An initial laser pulse from a laser transmitter is received and reflected by a first reflective surface of the laser receiver to produce a first reflected laser pulse and by a second reflective surface of the laser receiver to produce a second reflected laser pulse. A first double reflected laser pulse and a second double reflected pulse are detected at a photo detection unit of the laser receiver. The first double reflected laser pulse is produced as a result of the first reflected laser pulse reflecting off a reflective surface of the laser transmitter. The second double reflected laser pulse is produced as a result of the second reflected laser pulse reflecting off the reflective surface of the laser transmitter. An azimuth angle associated with the laser receiver is determined based on the first double reflected laser pulse and the second double reflected laser pulse.

In one embodiment, the azimuth angle is determined by determining a phase difference between the first double reflected laser pulse and the second double reflected laser pulse. One or more additional orientation angles (e.g., pitch and roll) may be determined using a (e.g., tilt) sensor.

In one embodiment, the initial laser pulse is detected at the photo detection unit of the laser receiver, and the initial laser pulse is received by the first reflective surface of the laser receiver prior to the photo detection unit detecting the initial laser pulse and by the second reflective surface of the laser receiver after the photo detection unit detects the initial laser pulse.

In one embodiment, the initial laser pulse is modulated with a plurality of modulated subcarriers by a laser transmitter to transmit the horizontal angle associated with the laser transmitter and additional data associated with the laser transmitter. The modulated initial laser pulse may be demodulated to extract the horizontal angle by multiplying a vector of phases of the plurality of modulated subcarriers with a multiplier vector.

In accordance with one embodiment, a laser receiver includes a photo detection unit and at least one reflective surface each having a center point positioned to be offset from a center point of the photo detection unit.

In one embodiment, the at least one reflective surface comprises a first reflective surface and a second reflective surface positioned on opposite sides of a plane intersecting a center of the photo detection unit. The first reflective surface and the second reflective surface of the laser receiver may be symmetrically positioned with respect to the plane. The plane may be normal to a surface of the photo detection unit.

In one embodiment, the laser receiver further includes a non-reflective area positioned around the photo detection unit. The photo detection unit may be for receiving an initial laser pulse from a laser transmitter and a size of the non-reflective area is at least twice a size of a reflective surface of the laser transmitter.

In one embodiment, the laser receiver includes a (e.g., tilt) sensor for determining one or more additional orientation angles (e.g., pitch and roll).

In accordance with one or more embodiments, systems and methods for operating a laser transmitter are provided. An initial laser pulse is projected towards a laser receiver. A first reflected laser pulse is received and reflected to produce a first double reflected laser pulse. A second reflected laser pulse is received and reflected to produce a second double reflected laser pulse. The first reflected laser pulse and the second reflected laser pulse are produced as a result of the initial laser pulse reflecting off a first reflective surface and a second reflective surface respectively of the laser receiver.

In one embodiment, the initial laser pulse is modulated with a plurality of modulated subcarriers by a laser transmitter to transmit a horizontal angle associated with the laser transmitter and additional data associated with the laser transmitter.

In accordance with one embodiment, a laser measuring system comprising a laser transmitter and a laser receiver is provided. The laser transmitter includes one or more laser sources for projecting an initial laser pulse towards a laser receiver and a reflective surface. The laser receiver includes a first reflective surface for reflecting the initial laser pulse to provide a first reflected laser pulse, and a second reflective surface for reflecting the initial laser pulse to provide a second reflected laser pulse. The laser receiver further includes a photo detection unit for receiving 1) a first double reflected laser pulse produced by the first reflected laser pulse reflecting off the reflective surface of the laser transmitter, and 2) a second double reflected laser pulse produced by the second reflected laser pulse reflecting off the reflective surface of the laser transmitter. The laser transmitter determines an azimuth angle associated with the laser receiver based on the first and second double reflected laser pulse.

In accordance with one embodiment, systems and methods for operating a laser receiver and a laser transmitter for measuring position and/or orientation of the laser receiver are provided. An initial laser pulse is projected by a laser transmitter towards a laser receiver. The initial laser pulse is received and reflected by a first reflective surface of the laser receiver to produce a first reflected laser pulse. The first reflected laser pulse is received and reflected by a reflective surface of the laser transmitter to produce a first double reflected laser pulse. The first double reflected laser pulse is detected at a photo detection unit of the laser receiver. The initial laser pulse is received and reflected by a second reflective surface of the laser receiver to produce a second reflected laser pulse. The second reflected laser pulse is received and reflected by the reflective surface of the laser transmitter to produce a second double reflected laser pulse. The second double reflected laser pulse is detected at the photo detection unit of the laser receiver. An azimuth angle associated with the laser receiver is determined based on the first double reflected laser pulse and the second double reflected laser pulse.

These and other advantages of the invention will be apparent to those of ordinary skill in the art by reference to the following detailed description and the accompanying drawings.

BRIEF DESCRIPTION OF THE DRAWINGS

FIG. 9 shows a summary of exemplary demodulation performed by a laser receiver according to FIG. 8;

FIG. 10 shows an exemplary table summarizing demodulation with five subcarriers;

FIG. 11 shows an exemplary table summarizing demodulation with six subcarriers;

FIG. 12 shows an illustrative method of operation of a laser receiver for determining a position and/or orientation associated with a laser receiver;

FIG. 13 shows an illustrative method of operation of a laser transmitter for determining a position and/or orientation associated with a laser receiver;

DETAILED DESCRIPTION

In accordance with various embodiments of the present invention, a laser measuring system is provided for calculating full 3D position (i.e., vertical angle, horizontal angle, and distance) and/or full 3D orientation (i.e., azimuth angle and two tilt angles) associated with a laser receiver based on laser pulses received from a laser transmitter. In one embodiment, the laser transmitter includes a reflective surface offset from a center of a laser diode and the laser receiver includes two reflective surfaces each offset from a center of a photo diode. In this manner, an initial laser pulse projected by the laser transmitter will be reflected by the two offset reflective surfaces of the laser receiver to the laser transmitter as first and second reflected laser pulses, which will then be reflected by the offset reflective surface of the laser transmitter back to the laser receiver as first and second double reflected laser pulses. By offsetting the reflective surfaces of the laser receiver, the laser receiver is able to easily distinguish between the direct initial laser pulse and the first and second double reflected laser pulses by adding a time delay between the direct initial laser pulse and the first and second double reflected laser pulses, thus separating the signals in the time domain. By providing for the two reflective surfaces on the laser receiver on opposite sides of the photo diode, the laser receiver is able to determine its azimuth angle by comparing phases of the first double reflected laser pulse and the second double reflected laser pulse. Advantageously, the laser receiver determines an azimuth angle, as well as a three dimensional position (i.e., vertical angle, horizontal angle, and distance), associated with the laser receiver based on the transmitted and reflected signals. In one embodiment, the laser receiver may also be equipped with one or more sensors (e.g., a tilt sensor) to provide two additional orientation angles (i.e., roll and pitch), which together with the azimuth angle (i.e., yaw), provide full three dimensional orientation associated with the laser receiver. The laser measuring system according to embodiments of the present invention may be used for, e.g., performing construction and agricultural tasks.

Figure 1:
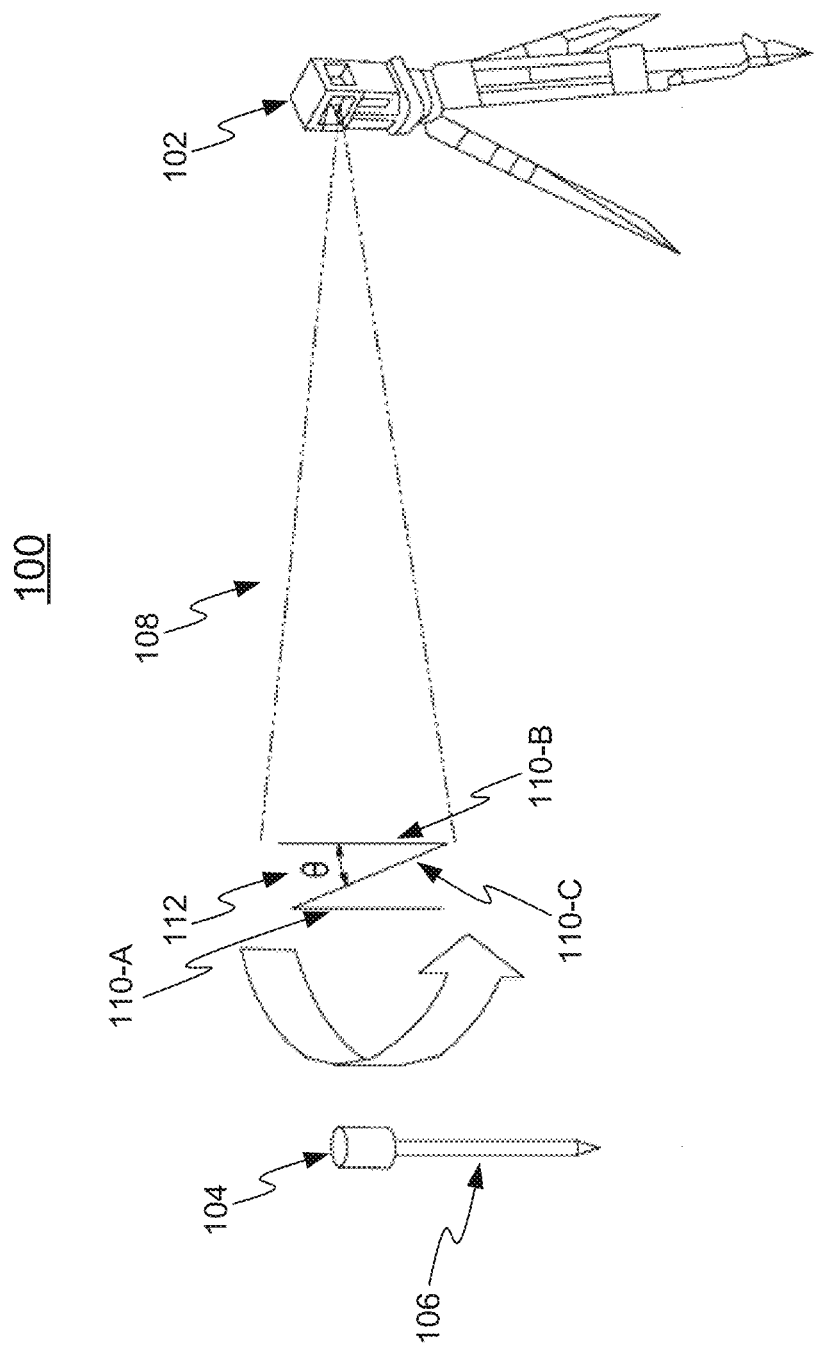
FIG. 1 shows an exemplary laser measuring system.

FIG. 1 shows a laser measuring system 100, in accordance with one or more embodiments. Laser measuring system 100 includes a laser transmitter 102 and a laser receiver 104. As illustratively shown in FIG. 1, laser receiver 104 is configured to be attached to a surveying pole 106. However, it should be understood that various configurations of laser receiver 104 are possible. For example, laser receiver 104 may be configured to be attached to a construction machine (e.g., excavator, dump truck, bull dozer, etc.) or may be a hand held device. Laser receiver 104 and laser transmitter 102 are described in more detail below with respect to FIGS. 2A and 2B, respectively. It should be understood that laser measuring system 100 may include any number of laser receivers for calculating position and orientation information for each laser receiver 104 based on laser beams received from laser transmitter 102.

Laser transmitter 102 projects N-shaped beams 108 in rotary irradiation at a constant speed, for example, as described in U.S. Pat. No. 7,196,302, issued Mar. 27, 2007, the disclosure of which is incorporated herein by reference in its entirety. Laser transmitter 102 may project N-shaped beams 108 with modulation (e.g., phase or frequency). N-shaped beams 108 comprise a plurality of fan-shaped beams that are projected such that the cross-section of the luminous fluxes of beams 108 forms an N-shape. An N-shaped beam 108 is illustratively shown in FIG. 1 as vertical beam 110-A, vertical beam 110-B, and beam 110-C tilted at an angle θ 112 on a diagonal line with respect to vertical beams 110-A and 110-B to form an N-shape.

Figure 2A:
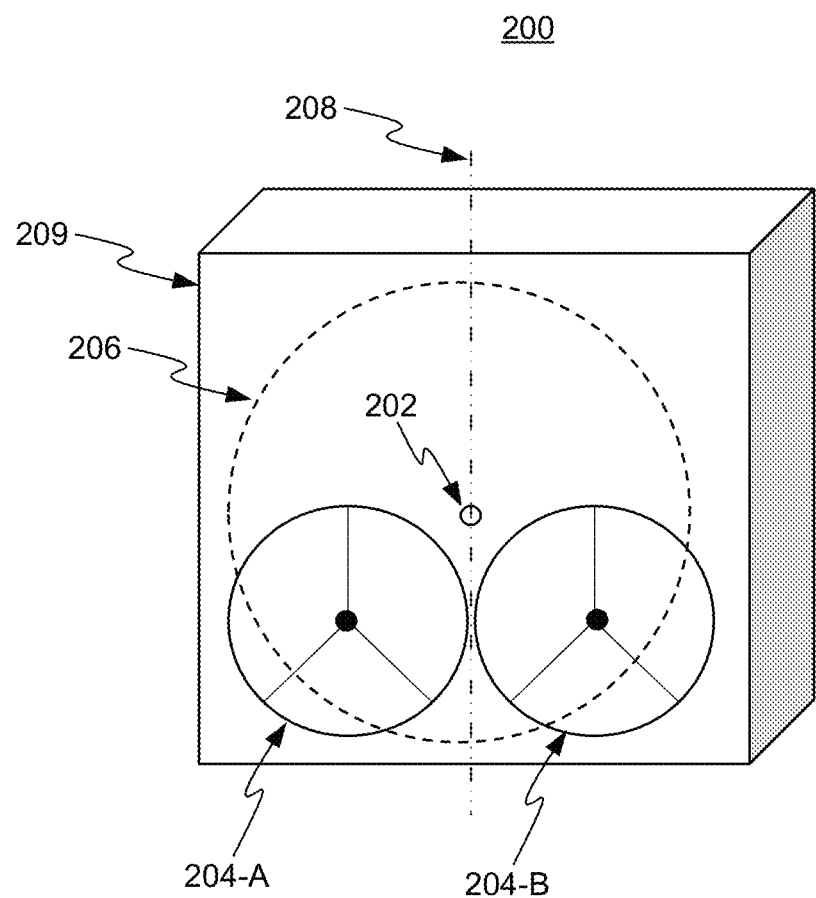
FIG. 2A shows an illustrative laser receiver with two reflective surfaces.

FIG. 2A shows a detailed view of a laser receiver 200, in accordance with one or more embodiments. In one embodiment, laser receiver 200 is laser receiver 104 of FIG. 1. Laser receiver 200 includes a photo detection unit 202 (e.g., photo diode) for detecting or receiving laser pulses from a laser transmitter (e.g., laser transmitter 102 of FIG. 1) and two reflective surfaces 204-A and 204-B (collectively referred to herein as reflective surfaces 204). Reflective surfaces 204 may be any reflective surface suitable for reflecting laser pulses. For example, reflective surfaces 204 may be a corner reflector or prism with a plurality of mirror edges, or may be a flat surface of a retro reflector. Reflective surfaces 204 are each positioned such that a center point of each reflective surface 204 is offset from a center point of photo detection unit 202, and such that the center of reflective surfaces 204 are located within non-reflective area 206. In one embodiment, the center of reflective surfaces 204 are located within an area twice the size (e.g., diameter) of a reflective surface of the laser transmitter (e.g., reflective surface 214 on laser transmitter 210 in FIG. 2B). In one embodiment, reflective surfaces 204 are offset on opposite sides of plane 208. Plane 208 intersects a center of photo detection unit 202 and is normal to a surface of photo detection unit 202. In one example, reflective surfaces 204 are symmetrically positioned with respect to plane 208 on opposite sides of plane 208. In another embodiment, a center point of each reflective surface 204 is offset from a center point of photo detection unit 202 such that an initial laser pulse (e.g., projected from laser transmitter 102) will reflect off reflective surfaces 204-A and 204-B (or vice versa) before and after, respectively, photo detection unit 202 detects the initial laser pulse.

Figure 2B:
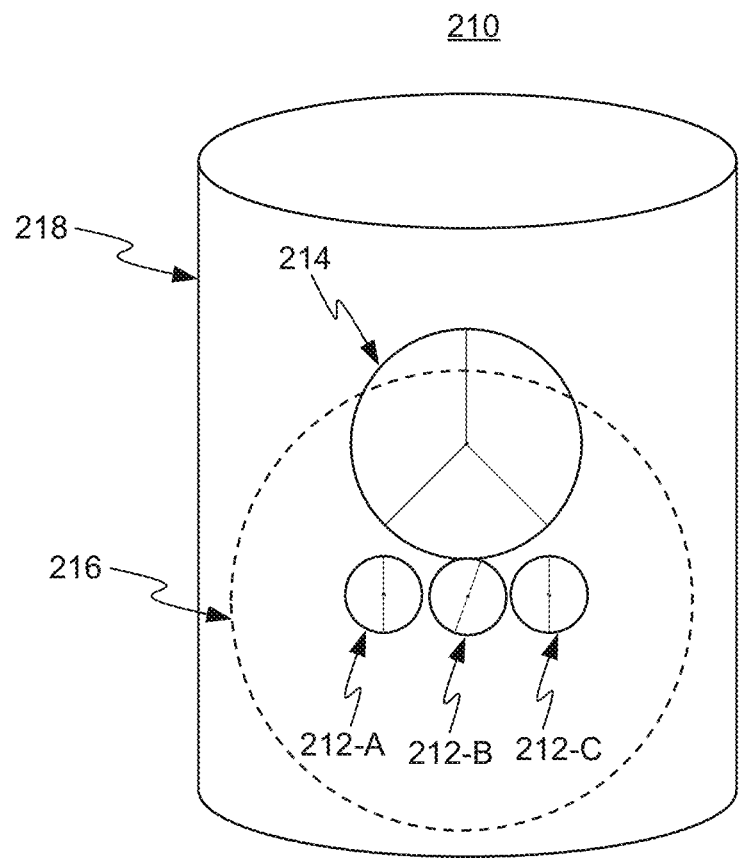
FIG. 2B shows an illustrative laser transmitter.

In order to prevent unwanted reflections from reflective objects behind laser receiver 200, a front face 209 of the housing of laser receiver 200 is at least twice the size (e.g., diameter, surface area) of a reflective surface of the laser transmitter (e.g., reflective surface 214 on laser transmitter 210 in FIG. 2B). In one embodiment, laser receiver 200 has non-reflective area 206 that is positioned (e.g., centered) around photo detection unit 202 and that has a non-reflective surface. While non-reflective area 206 is shown as overlapping portions of reflective surfaces 204 in FIG. 2A for illustrative purposes, it should be understood that reflective surfaces 204 are positioned over non-reflective area 206 and that such portions of reflective surfaces 204 are not non-reflective. Non-reflective area 206 may be of any suitable size and may have any suitable non-reflective surface, such as, e.g., black paint. In one embodiment, non-reflective area 206 is at least twice the size (e.g., surface area) of a reflective surface of the laser transmitter (e.g., reflective surface 214 on laser transmitter 210 in FIG. 2B).

FIG. 2B shows a detailed view of a laser transmitter 210, in accordance with one or more embodiments. In one embodiment, laser transmitter 210 is laser transmitter 102 in FIG. 1. Laser transmitter 210 includes a plurality of laser sources 212-A, 212-B, and 212-C (collectively referred to herein as laser sources 212), such as, e.g., laser diodes, configured to project fan-shaped beams in rotary irradiation to thereby form N-shaped beams. Laser transmitter 210 also includes a reflective surface 214, which may be any surface suitable for reflecting laser pulses (e.g., a corner reflector or prism with a plurality of mirror edges, or a flat surface of a retro reflector). A center point of reflective surface 214 is positioned offset from a center point of the plurality of laser sources 212 and is located within non-reflective area 216. In one embodiment, the center of reflective surface 214 is located within an area twice the size (e.g., diameter) of a reflective surface of the laser receiver (e.g., reflective surface 206 on laser receiver 200 in FIG. 2A). In one embodiment, reflective surface 214 is a same size (e.g., diameter, surface area) as the reflective surfaces on the laser receiver (e.g., reflective surface 206 on laser receiver 200 in FIG. 2A), but may also be difference sizes.

In order to prevent unwanted reflections from reflective objects behind laser transmitter 210, a front face 218 of the housing of laser transmitter 210 is at least twice the size (e.g., diameter, surface area) of the reflective surfaces on the laser receiver (e.g., reflective surfaces 204-A or 204-B on laser receiver 200 in FIG. 2A). In one embodiment, laser transmitter 210 has non-reflective area 216 that is positioned (e.g., centered) around the plurality of laser sources 212 and that has a non-reflective surface. While non-reflective area 216 is shown as overlapping portions of reflective surface 214 in FIG. 2B for illustrative purposes, it should be understood that reflective surface 214 is positioned over non-reflective area 216 and that such portions of reflective surface 214 are not non-reflective. Non-reflective area 216 may be of any suitable size and may have any suitable non-reflective surface, such as, e.g., black paint. In one embodiment, non-reflective area 216 is at least twice the size (e.g., surface area) of any reflective surfaces on the laser receiver (e.g., reflective surfaces 204 on laser receiver 200 in FIG. 2A).

Figure 3:
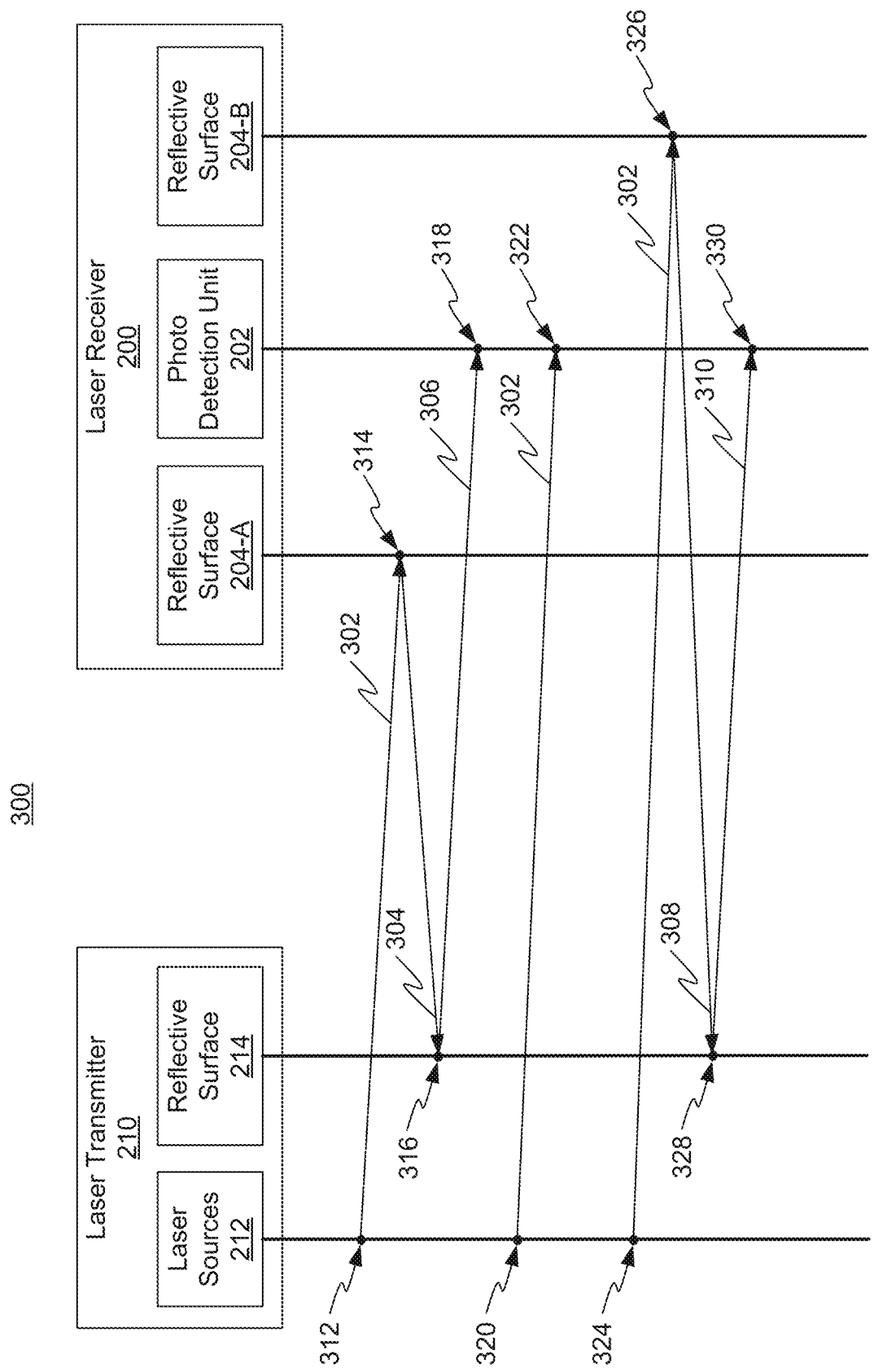
FIG. 3 shows a diagram of laser beam transmission and reflection between a laser transmitter and a laser receiver.

FIG. 3 shows a diagram 300 of laser pulse transmission and reflection between laser transmitter 210 and laser receiver 200, in accordance with one or more embodiments. FIG. 3 will be described with reference to FIGS. 1, 2A, and 2B. Diagram 300 shows the transmission and reflection of laser pulses between elements of laser transmitter 210 and laser receiver 200 where events occur in time from top to bottom with respect to a vertical axis, in accordance with one embodiment.

Laser sources 212 of laser transmitter 210 projects initial laser pulse 302 towards laser receiver 200. Initial laser pulse 302 is continuously projected in rotary irradiation across laser receiver 200 over time. Accordingly, initial laser pulse 302 is continuously projected in rotary irradiation across reflective surface 204-A, photo detection unit 202, and reflective surface 204-B of laser receiver 200 at time points 312, 320, and 324, respectively. In one embodiment, initial laser pulse 302 is an N-shaped beam (e.g., N-shaped beam 108) comprising three separate beams 110-A, 110-C, and 110-B projected by laser sources 212-A, 212-B, and 212-C, respectively. In one embodiment, initial laser pulse 302 is modulated with a plurality of modulated subcarriers to transmit the horizontal angle associated with laser receiver 200 and additional data associated with laser transmitter 210. The horizontal angle associated with laser receiver 200 is provided by the encoder on laser transmitter 210 and transmitted to laser receiver 200 via the modulated initial laser pulse 302.

Initial laser pulse 302 projected by laser sources 212 of laser transmitter 210 at time point 312 is received and reflected by reflective surface 204-A of laser receiver 200 at time point 314 towards laser transmitter 210 as first reflected laser pulse 304, which is received and reflected by reflective surface 214 of laser transmitter 210 at time point 316 towards laser receiver 200 as first double reflected laser pulse 306, where it is detected by photo detection unit 202 of laser receiver 200 at time point 318.

As laser sources 212 continue in rotary irradiation across laser receiver 200, initial laser pulse 302 projected by laser sources 212 at time point 320 is detected by photo detection unit 202 of laser receiver 200 at time point 322.

As laser sources 212 continue in rotary irradiation across laser receiver 200, initial laser pulse 302 projected by laser sources 212 at time point 324 is received and reflected by reflective surface 204-B of laser receiver 200 at time point 326 towards laser transmitter 210 as second reflected laser pulse 308, which is received and reflected by reflective surface 214 of laser transmitter 210 at time point 328 towards laser receiver 200 as second double reflected laser pulse 310, where it is detected by photo detection unit 202 of laser receiver 200 at time point 330.

Due to the offsets of reflective surfaces 204-A and 204-B on laser receiver 200, initial laser pulse 302 is received and reflected by first reflective surface 204-A (at time point 314) before photo detection unit 202 detects initial laser pulse 302 (at time point 322) and initial laser pulse 302 is received and reflected by second reflective surface 204-B (at time point 326) after photo detection unit 202 detects initial laser pulse 302 (at time point 322). The offsets of reflective surfaces 204-A and 204-B enable laser receiver 200 to easily distinguish (in the time domain) between initial laser pulse 302 (received directly from laser transmitter 210) and the first and second double reflected laser pulses 306 and 310. Laser receiver 200 determines full 3D position information (i.e., vertical angle, horizontal angle, and distance) and an azimuth angle of the laser receiver 200 based the transmitted and reflected laser pulses.

Figure 4:
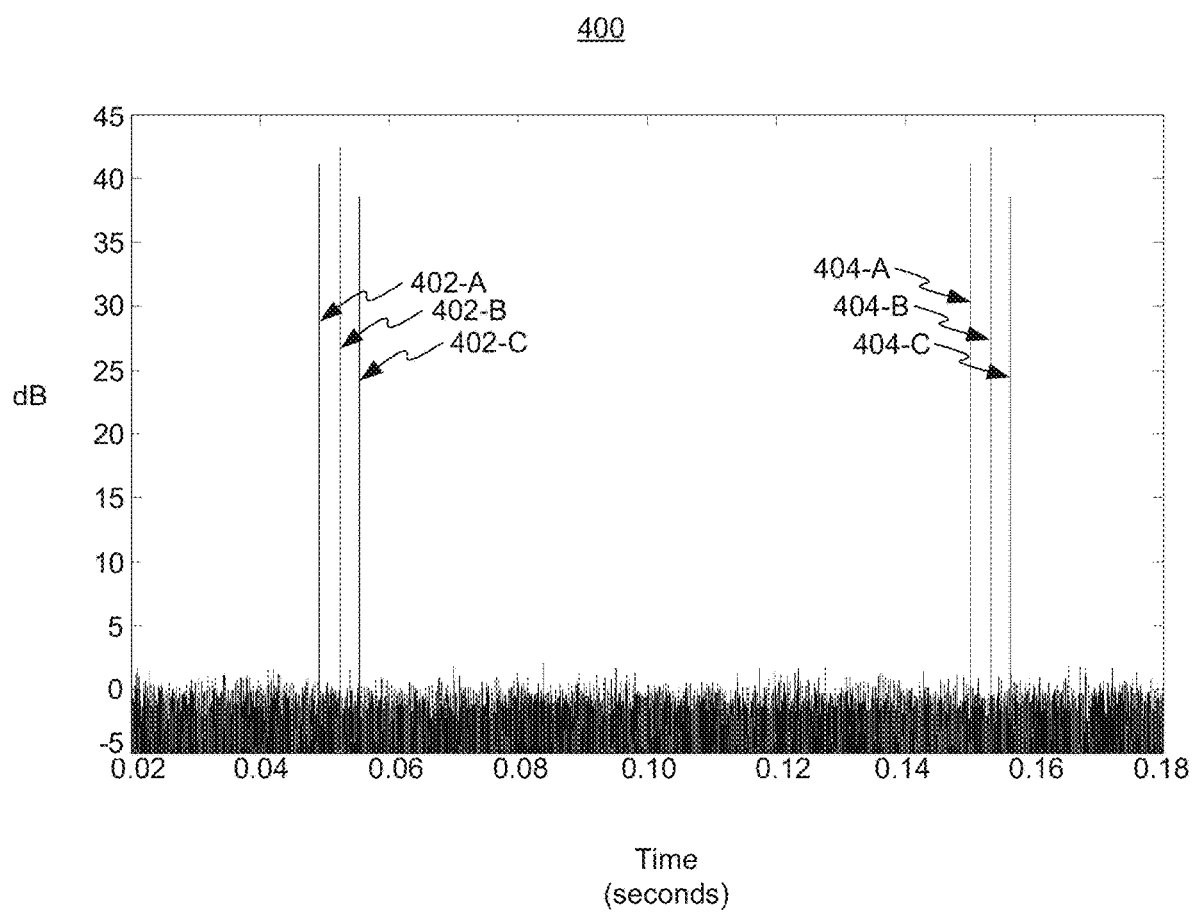
FIG. 4 shows an illustrative graph of N-beam signals received by a laser receiver as a laser transmitter rotates for two revolutions.

FIG. 4 shows an illustrative graph 400 of N-beam signals received by a laser receiver (e.g., laser receiver 200 of FIG. 2A) from a laser transmitter (e.g., laser transmitter 210 of FIG. 2B) rotating for two revolutions, in accordance with one or more embodiments. Graph 400 shows the laser receiver detecting an N-beam signal 402 comprising a first laser pulse 402-A projected by laser source 212-A, a middle laser pulse 402-B transmitted by laser source 212-B, and a last laser pulse 402-C transmitted by laser source 212-C during a first rotation and an N-beam signal 404 comprising a first laser pulse 404-A projected by laser source 212-A, a middle laser pulse 404-B projected by laser source 212-B, and a last laser pulse 404-C projected by laser source 212-C during a second rotation. The time between N-beam signal 402 and N-beam signal 404 represents one rotation of the laser transmitter (i.e., the transmitter head of the laser transmitter) rotating at 10 Hertz. It should be understood that the laser receiver may detect double reflected laser pulses of N-beam signals 402 and 404 which are not shown in graph 400.

Figure 5:
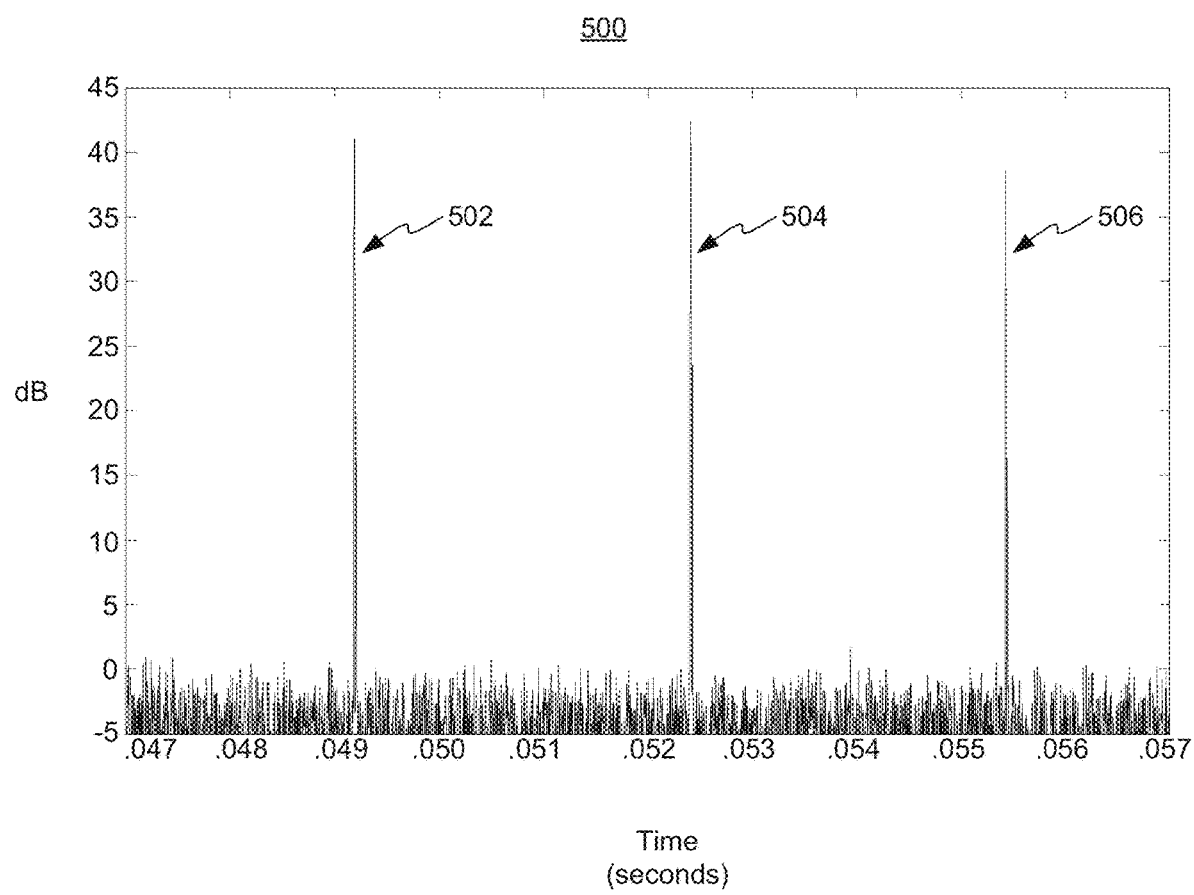
FIG. 5 shows an illustrative graph of signals of an N-beam received by a laser receiver for one revolution.

FIG. 5 shows an illustrative graph 500 of signals of an N-beam received by a laser receiver (e.g., laser receiver 200 of FIG. 2) for one revolution, in accordance with one or more embodiments. The laser receiver receives beams 502, 504, and 506, which collectively form an N-shaped beam (e.g., N-shaped beam 108 of FIG. 1). Specifically, beam 502 corresponds to a vertical beam (e.g., vertical beam 110-A), beam 504 corresponds to a tilted beam (e.g., tilted beam 110-C), and beam 506 corresponds to a vertical beam (e.g., vertical beam 110-B).

Figure 6:
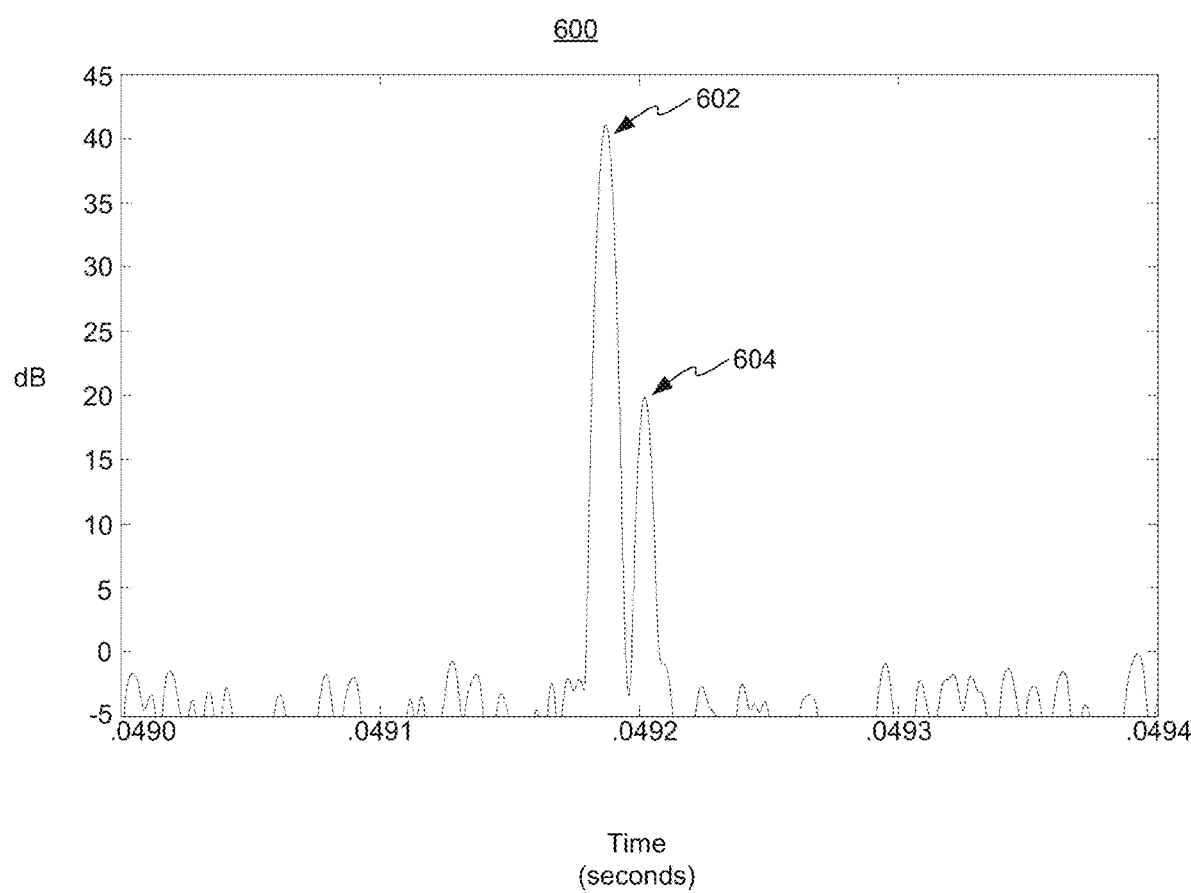
FIG. 6 shows an illustrative graph 600 of signals received by a laser receiver with one direct pulse and one double reflected pulse.

FIG. 6 shows an illustrative graph 600 of signals received by a laser receiver (e.g., laser receiver 200 in FIG. 2) with one direct pulse and one double reflected pulse, in accordance with one or more embodiments. The laser receiver as described with respect to FIG. 6 includes a single reflective surface (e.g., reflective surface 204-B in FIG. 2). Accordingly, as shown in graph 600, the laser receiver receives a direct initial laser pulse 602 and a double reflected laser pulse 604.

Figure 7A:
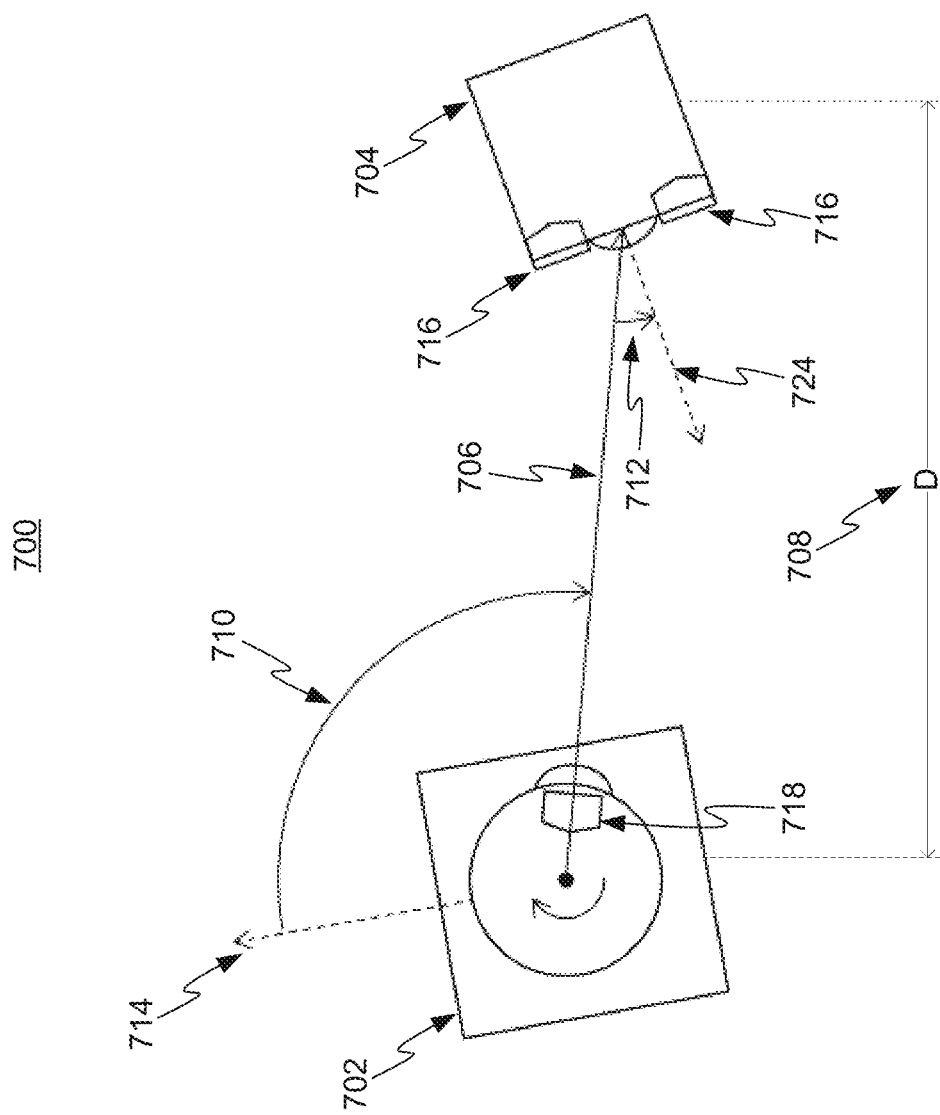
FIG. 7A is a top-down view showing further details of a laser measuring system.
Figure 7B:
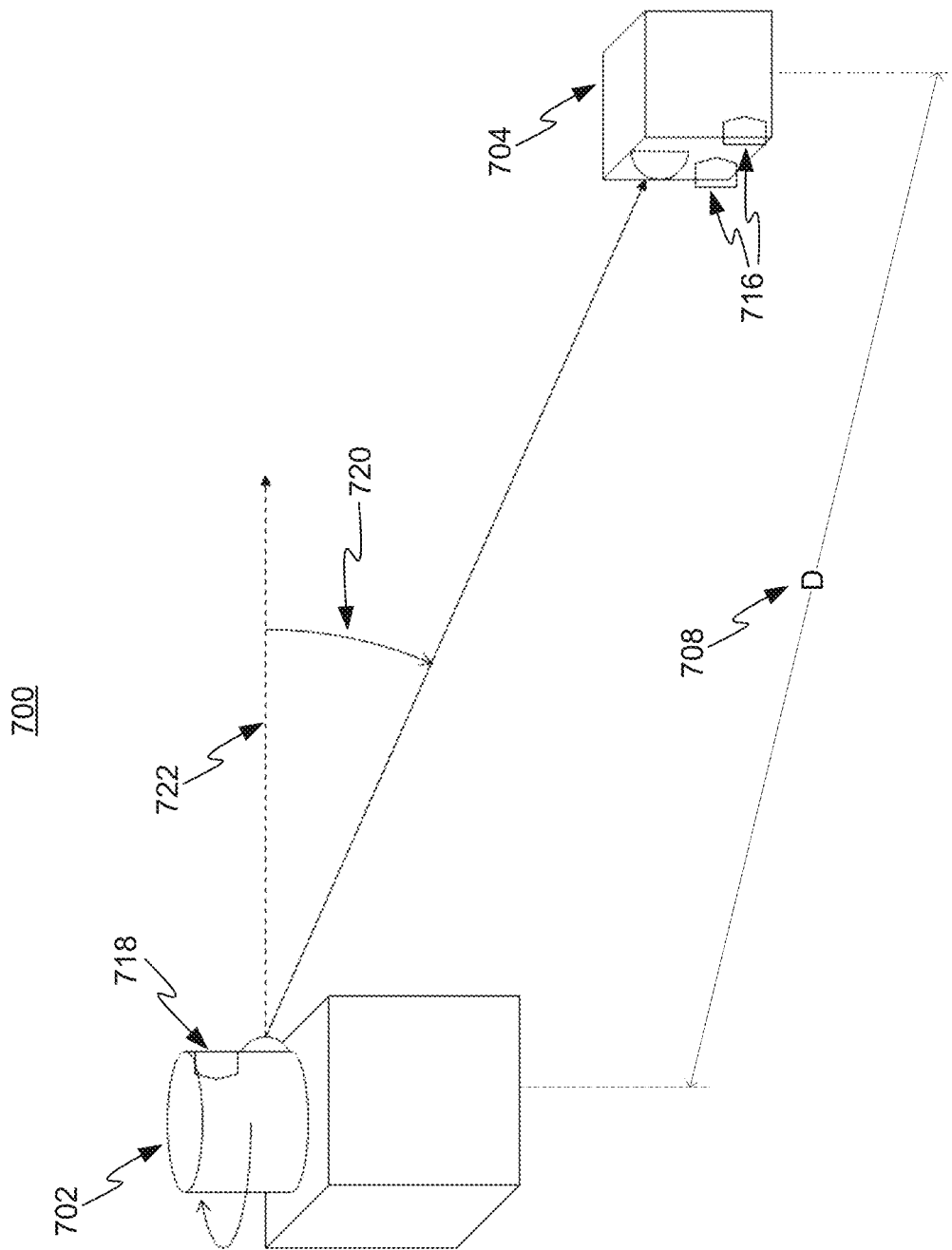
FIG. 7B is a perspective view showing further details of a laser measuring system.

FIG. 7A is a top-down view and FIG. 7B is a perspective view showing further details of a laser measuring system 700, in accordance with one or more embodiments. In FIGS. 7A and 7B, laser transmitter 702 continuously projects an N-shaped beam 706 to laser receiver 704 in rotary irradiation. Laser transmitter 702 and laser receiver 704 include reflective surfaces 718 and 716, respectively. In one embodiment, laser transmitter 702 may be laser transmitter 102 of FIG. 1 or laser transmitter 210 of FIG. 2B and laser receiver 704 may be laser receiver 104 of FIG. 1 or laser receiver 200 of FIG. 2A. It should be understood that FIGS. 7A and 7B show a high-level representation of laser measuring system 700 and that laser measuring system 700 may include additional components (e.g., non-reflective areas).

The position of laser receiver 704 may be defined in terms of various parameters. In one embodiment, the position of laser receiver 704 may be represented by 3D coordinates and 3D orientation angles. The 3D coordinates of the laser receiver 704 may be defined by a vertical angle 720, a horizontal angle 710, and a distance D 708. The 3D orientation angles of the laser receiver 704 may be defined by a azimuth orientation angle 712 (i.e., a yaw) and two tilt angles (i.e., a pitch and a roll). Vertical angle 720 is an angle at which laser receiver 704 is located relative to a transmitter reference level plane 722. Horizontal angle 710 is an angle at which laser receiver 704 is located relative to a transmitter reference direction 714. Distance D 708 is the distance between laser transmitter 702 and laser receiver 704. Azimuth orientation angle 712 is the angle at which laser receiver 704 receives N-shaped beam 706 relative to a reference direction 724.

Parameters defining the 3D coordinates and 3D orientation angles of laser receiver 704 may be determined based on N-shaped beam 706 and its reflections. The vertical angle 720 associated with laser receiver 704 may be calculated according to Equation 1 as follows:

$$\text{Vertical Angle } V = k * \arctan\left(\frac{(t3 - t2)}{t2 - t1}\right) \quad \text{(Equation 1)}$$

where k is a coefficient based on the angle of laser inclination of the N-beam 706 (i.e., based on angle 112 of tilted beam 110-C in FIG. 1), and t1, t2, and t3 are timestamps of receiving each beam (e.g., beams 110-A, 110-C, and 110-B in FIG. 1, pulses 402-A, 402-B, 402-C in FIG. 4, or beams 502, 504, 506 in FIG. 5) of the N-beam 706.

The horizontal angle 710 associated with laser receiver 704 may be demodulated from N-shaped beam 706 according to Equation 2 as follows:

$$\text{Horizontal Angle } H = P1 - P2 - P3 + P4 \quad \text{(Equation 2)}$$

where H is the coarse horizontal angle, and P1, P2, P3, and P4 are phases of the demodulated subcarriers of N-shaped beam 706. The horizontal angle can be demodulated separately for each direct pulse of N-shaped beam 706 (e.g., for each beam 502, 504, 506 in FIG. 5). The physical angle between each direct pulse of N-shaped beam 706 is used to compensate for the difference between horizontal angles between each pulse of N-shaped beam 706 (e.g., the difference in the horizontal angles for beams 502, 504, and 506). After the compensation, those horizontal angles for each pulse of N-shaped beam 706 can be averaged to reduce noise.

The distance D 708 between laser transmitter 702 and laser receiver 704 is calculated by comparing the phase of N-shaped beam 706 (i.e., the direct initial laser pulse) and the phase of one of the double reflected laser pulses of N-shaped beam 706 received by laser receiver 704 (e.g., first double reflected laser pulse 306 or second double reflected laser pulse 310 of FIG. 3 or pulse 602 and pulse 604 of FIG. 6) according to Equation 3 as follows:

Distance $D=(c/2f_i)(P_{r_i}-P_{d_i}/2\pi)$ (Equation 3)

where c is the speed of light, P is the phase (e.g., P1, P2, P3, or P4) of a reflected pulse (i.e., a double reflected pulse) of N-shaped beam 706 in radians, and $P_{d_i}$ is the phase of N-shaped beam 706 (i.e., the direct initial laser pulse), and $f_i$ is the effective frequency of the i-th subcarrier. The distance may be calculated independently on all 4 subcarriers and then averaged. In one embodiment, the distance may be calculated separately for each direct pulse of N-shaped beam 706 and averaged.

The azimuth orientation angle 712 associated with laser receiver 704 may be calculated by comparing the phase of the first double reflected laser pulse (e.g., first double reflected laser pulse 306 of FIG. 4) of N-shaped beam 706 and the phase of the second double reflected laser pulse (e.g., second double reflected laser pulse 310) of N-shaped beam 706 according to Equation 4 B as follows:

Azimuth angle=arcsin($c(P_1-P_2)/4\pi LF$) (Equation 4)

where c is the speed of light, $P_1$ and $P_2$ are phases of the first double reflected laser pulse and the second double reflected laser pulse respectively, L is the distance between a center of the reflective surfaces reflecting the first double reflected laser pulse and the second double reflected laser pulse (e.g., reflective surfaces 204-A and 204-B of FIG. 2A), and F is the efficient carrier frequency.

In one embodiment, laser receiver 704 is configured with one or more sensors (not shown) to measure one or more additional orientation angles, such as, e.g., the roll and the pitch, of laser receiver 704. The one or more sensors may be any suitable sensor for measuring orientation of laser receiver 200. For example, the one or more sensors may include a tilt sensor, such as, e.g., an inertial measurement unit, an accelerometer, an inclinometer, etc.

Advantageously, in accordance with one or more embodiments, full 3D positioning and 3D orientation is achieved for full rigid body orientation in six dimensions. Such full 3D positioning and 3D orientation is determined by laser receiver 704 with no communication from laser receiver 704 to laser transmitter 702. In particular, laser receiver 704 determines all information with respect to its positioning and orientation, while laser transmitter 702 broadcasts all required information and passively reflects the laser pulses. Accordingly, the need for communication from laser receiver 704 to laser transmitter 702 is eliminated.

In accordance with one embodiment, with reference to FIG. 1, laser transmitter 102 modulates N-shaped beams 108, using a plurality of subcarriers, with an instant rotation angle of laser transmitter 102 as well as additional information that may be useful to laser receiver 104. In this manner, upon receiving the modulated N-beams 108, laser receiver 104 may additionally or alternatively estimate the horizontal angle associated with laser receiver 104 by measuring the phase (or frequency) of the subcarriers of the carrier wave used in the modulation. It should be understood that while described herein in the context of a laser measuring system, the modulation using a plurality of subcarriers may be applied for transmitting a signal of any type, such as, e.g., a radio frequency signal.

The plurality of subcarriers are sidebands of the carrier wave used to modulate N-shaped beams 108. The plurality of subcarriers may include any suitable number of subcarriers. In one embodiment, the plurality of subcarriers include at least two subcarriers with the direct synthesis method where there is locked synchronization between carrier frequency and symbol frequency (i.e., one oscillator). In another embodiment, the plurality of subcarriers include at least three subcarriers without the direct synthesis method where there is no synchronization between carrier frequency and symbol frequency (i.e., two independent oscillators).

Laser receiver 104 receives modulated N-shaped beams 108 and measures the phases of each of the plurality of subcarriers. The phases of each of the plurality of subcarriers form a vector in N-dimensional space, where N is the number of subcarriers. The vector is transformed into a transformed vector using a transformation matrix. Carrier phase, subcarrier phase, and head rotation (horizontal) angle of laser transmitter 102 could be independently extracted from the transformed vector.

The plurality of subcarriers provide virtual channels by which laser transmitter 102 can transmit data to laser receiver 104 (as well as other laser receivers not shown in FIG. 1). Virtual channels are independently modulated signals, and the number of virtual channels correspond to the number of subcarriers. The virtual channels are extracted by multiplying the subcarrier phase vector (e.g., subcarrier phase vector {P1, P2, P3, P4} for four subcarriers) to the demodulation matrix (e.g., the matrix of table 900 of FIG. 9). In one embodiment, one or more virtual channels may be used to transmit a coarse estimation of the horizontal angle associated with laser receiver 104 without ambiguity. Different multiplication can be added to increase accuracy of the estimation of the horizontal angle associated with laser receiver 104. In another embodiment, one or more virtual channels may be used to broadcast additional data, such as, e.g., serial number of laser transmitter 102, transmitter channel, coordinates of the position of laser transmitter 102 (e.g., input by a user or calculated using other methods), calibration data (e.g., precise angles of N-shaped beams 108), or any other data that may be useful to laser receiver 104.

Figure 8:
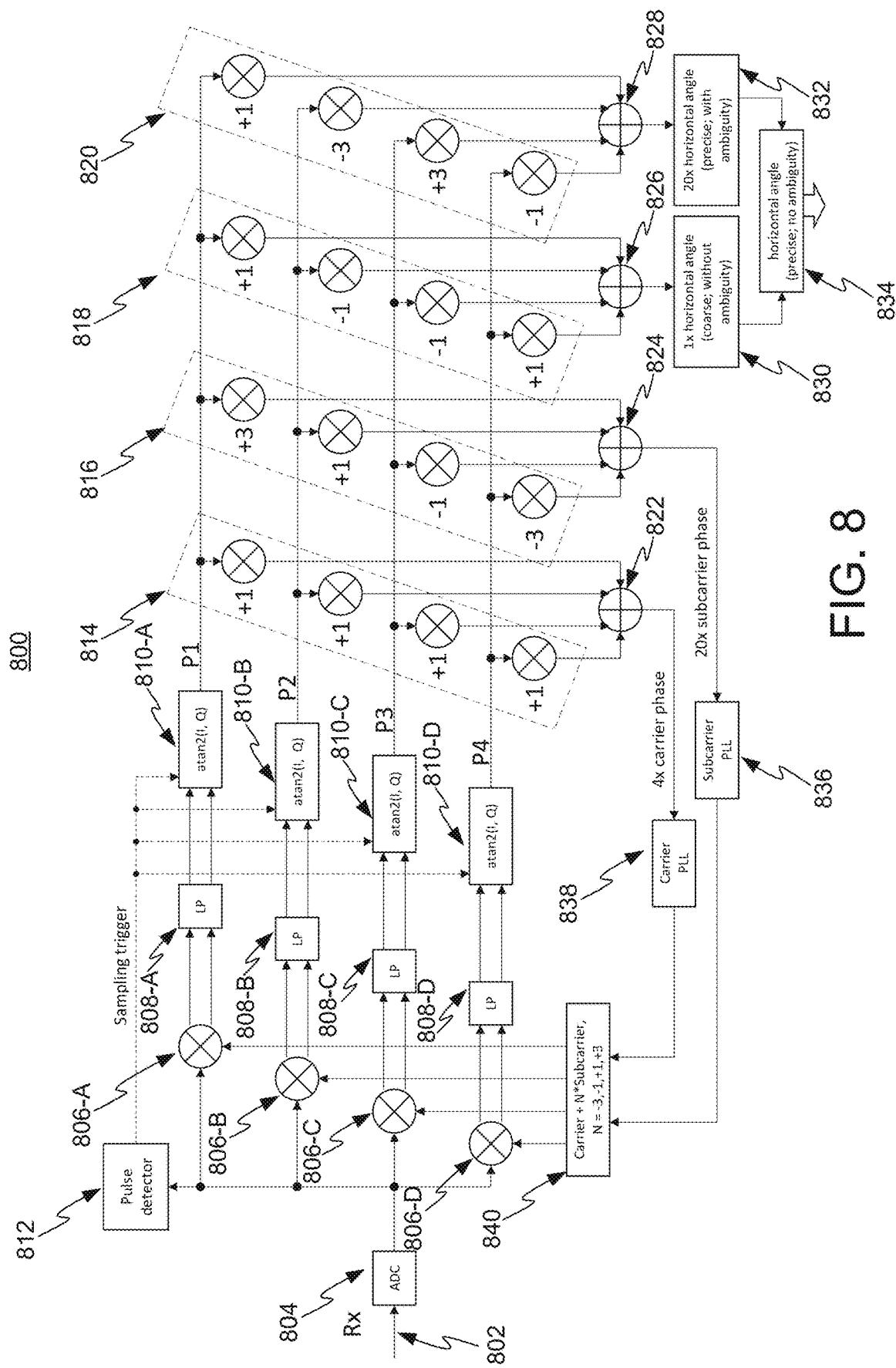
FIG. 8 shows a workflow for demodulation of a horizontal angle.

Referring to FIG. 8, with continued reference to FIG. 1, a workflow 800 for demodulation of a horizontal angle is shown, in accordance with one or more embodiments. Workflow 800 may be performed by a laser receiver, such as, e.g., laser receiver 104 of FIG. 1, laser receiver 200 of FIG. 2A, or laser receiver 704 of FIG. 7.

Laser transmitter 102 may modulate N-shaped beams 108 using four subcarriers. The modulated signal (TxSignal) is represented in Equation 5 as follows, where A in the instant head rotation angle of laser transmitter 102 (from its encoder), C is the carrier phase, S is the subcarrier phase, and P1, P2, P3, and P4 are phases of the modulated subcarrier signals.

$$T \times \text{Signal} = \sin(P1) + \sin(P2) + \sin(P3) + \sin(P4) \quad \text{(Equation 5)}$$

where $$P1 = C + 3S + \frac{A}{4} + A, P2 = C + S - \frac{A}{4} - 3A,$$

$$P3 = C - S - \frac{A}{4} + 3A, \text{ and}$$

$$P4 = C - 3S + \frac{A}{4} - A.$$

Phases P1, P2, P3, and P4 are derived from the same phase S with integer multiplication and are therefore interlocked (i.e., derived from the same oscillator and are not free running).

As shown in FIG. 8, laser receiver 104 (e.g., photo detection unit of laser receiver 104 receives the modulated signal 802, which is sampled by analog-to-digital converter (ADC) 804 at an appropriate rate. The sampled signal is input into multipliers 806-A, 806-B, 806-C, and 806-D (collectively referred to herein as multipliers 806) which perform frequency shifting, as well as pulse detector 812. Pulse detector 812 determines whether the sampled signal is a pulse by, e.g., comparing the sampled signal to a threshold, and triggers sampling of phases {P1, P2, P3, P4}. The multipliers 806 multiply the sampled signal with respective phases from digital local oscillator 840, where the respective phases are determined as the Carrier Phase+N*Subcarrier Phase, wherein N is −3, −1, +1, and +3 respectively in the example shown in FIG. 8. The outputs of multipliers 806 are complex signals comprising in-phase (I) and quadrature (Q) components, which are low pass filtered by a respective low pass filter 808-A, 808-B, 808-C, and 808-D (collectively referred to herein as low pass filters 808).

The filtered signals from low pass filters 808 are converted to a phase by respective phase converters 810-A, 810-B, 810-C, and 810-D (collectively referred to herein as phase converters 810) using phase=arctan(Q/I) to determine phases P1, P2, P3, and P4. Multipliers 814 apply scalar multiplication to respectively multiply phases P1, P2, P3, and P4 with orthogonal multiplier vector {+1, +1, +1, +1}. The outputs are combined by combiner 822 to extract the carrier phase C with a 4× multiplication factor. The carrier phase C is input into carrier phase-locked loop 838, which outputs a phase to digital local oscillator 840. Multipliers 816 apply scalar multiplication to respectively multiply phases P1, P2, P3, and P4 with orthogonal multiplier vector {+3, +1, −1, −3}. The outputs are combined by combiner 824 to extract the subcarrier phase S with a 20x multiplication factor. The subcarrier phase S is input into subcarrier phase-locked loop 836, which outputs a phase to digital local oscillator 840.

Multipliers 818 apply scalar multiplication to respectively multiply phases P1, P2, P3, and P4 with orthogonal multiplier vector {+1, −1, −1, +1}. The outputs are combined by combiner 826 to extract the coarse horizontal angle A 826 with no ambiguity and with a 1× multiplication factor. Accordingly, an estimate of horizontal angle A may be extracted accordingly to Equation 6 as follows:

$$A_{est} =$$
$$+P1 - P2 - P3 + P4 = C + 3S + \frac{A}{4} + A - C - S + \frac{A}{4} + 3A -$$
$$C + S + \frac{A}{4} - 3A + C - 3S + \frac{A}{4} - A = \frac{A}{4} + \frac{A}{4} + \frac{A}{4} + \frac{A}{4}$$

(Equation 6)

Multipliers 820 apply scalar multiplication to respectively multiply phases P1, P2, P3, and P4 with orthogonal multiplier vector {+1, −3, +3, −1}. The outputs are combined by combiner 828 to extract the precise horizontal angle A 832 with ambiguity and with a 20x multiplication factor. Coarse horizontal angle 830 without ambiguity and precise horizontal angle 832 with ambiguity are combined to determine precise horizontal angle 834 without ambiguity.

FIG. 9 shows a table 900 summarizing the demodulation shown in workflow 800 of FIG. 8.

Vectors {+1, +1, +1, +1}, {+3, +1, −1, −3}, {+1, −1, −1, +1}, and {+1, −3, +3, −1} are orthogonal vectors in four dimensions. Since {+1, −1, −1, +1} and {+1, −3, +3, −1} are encoded with information about the same angle A, it is possible to extract a noise estimation vectors {+21, −23, −17, +19}. Specifically, two vectors out of four are encoded with interdependent information (A/4 and A), so the new independent vector can be represented as linear combination as V'=(0.25)*{+1, −1, −1, +1}+{+1, −3, +3, −1}={1.25, −3.25, 2.75, −0.75}. Multiplying by 4 to get integer coefficients results in V={5, −13, 11, −3}. Accordingly, all the information about rotation angle A is encoded along basis {5, −13, 11, −3}. The orthogonal vector to {5, −13, 11, −3}, {1, 1, 1, 1}, and {+3, +1, −1, −3} with integer coefficients is {+21, −23, −17, +19}. The extracted signal along this vector {+21, −23, −17, +19} will not carry any information about carrier phase, subcarrier phase, and rotation angle A, and thus it will have only noise. This noise amount could be measured and used for estimating accuracy of rotation angle A.

FIG. 10 shows a table 1000 summarizing demodulation with five subcarriers, wherein the N subcarriers define an N dimensional space. Two dimensions are used for carrier phase information and subcarrier phase information. The three remaining dimensions provide three virtual data channels (i.e., Channel A, Channel B, and Channel C) for transmitting horizontal angle information and other data transmission. In one embodiment Channel A, Channel B, and Channel C could be used to transmit the horizontal angle with different level of precision. In another embodiment only two channels of Channel A, Channel B, and Channel C are used to transmit horizontal angle, while third channel is used to broadcast supporting information to all the receivers.

FIG. 11 shows a table 1100 summarizing demodulation with six subcarriers. Four virtual data channels (i.e., Channel A, Channel B, Channel C, and Channel D) are shared for horizontal angle information and other data transmission.

FIG. 12 shows a method 1200 of operation of a laser receiver for determining a position and/or orientation associated with the laser receiver, in accordance with one or more embodiments. Method 1200 will be described with reference to FIGS. 1-3. In one embodiment, the steps of method 1200 may be performed by laser receiver 104 of FIG. 1, laser receiver 200 of FIG. 2A, or laser receiver 704 of FIGS. 7A and 7B.

At step 1202, an initial laser pulse 302 from a laser transmitter 210 is received and reflected by a first reflective surface (e.g., reflective surface 204-A) of laser receiver 200 to produce a first reflected laser pulse 304. The initial laser pulse 302 may be an N-shaped beam 108 projected by laser sources 212 of laser transmitter 210 in rotary irradiation across laser receiver 200. In one embodiment, the initial laser pulse 302 is modulated with a plurality of modulated subcarriers to transmit horizontal angle information associated with the laser transmitter 210, as well as additional data associated with the laser transmitter 210, to the laser receiver 200.

At step 1204, a first double reflected laser pulse 306 is detected at a photo detection unit 202 of the laser receiver 200. The first double reflected laser pulse 306 is produced as a result of the first reflected laser pulse 304 reflecting off a reflective surface 214 of the laser transmitter 210.

At step 1206, the initial laser pulse 302 is detected at the photo detection unit 202 of the laser receiver 200.

At step 1208, the initial laser pulse 302 is received and reflected by a second reflective surface (e.g., reflective surface 204-B) of the laser receiver 200 to produce a second reflected laser pulse 308. In one embodiment, the initial laser pulse 302 is received and reflected by the first reflective surface 204-A prior to the photo detection unit 202 detecting the initial laser pulse 302 and the initial laser pulse 302 is received and reflected by the second reflective surface 204-B after the photo detection unit 202 detects the initial laser pulse 302.

At step 1210, a second double reflected laser pulse 310 is detected at the photo detection unit 202 of the laser receiver 200. The second double reflected laser pulse 310 is produced as a result of the second reflected laser pulse 308 reflecting off the reflective surface 214 of the laser transmitter 210.

At step 1212, an orientation azimuth angle associated with the laser receiver 200 is determined based on the first double reflected laser pulse 306 and the second double reflected laser pulse 310. The orientation azimuth angle may be determined by determining a phase difference between the first double reflected laser pulse 306 and the second double reflected laser pulse 310. In one embodiment, the laser receiver 200 may include one or more sensors to determine one or more additional orientation angles.

At step 1214, a 3D position associated with the laser receiver 200 is determined. For example, a distance between the laser receiver 200 and laser transmitter 210 may be determined based on a difference between the phase of the initial laser pulse 302 and the phase of one of the first double reflected laser pulse 306 or the second double reflected laser pulse 310 or both. A vertical angle associated with the laser receiver 200 may be determined based on the time difference ratio of the three beams of N-shaped beam of initial laser pulse 302. A horizontal angle associated with the laser receiver 200 may be determined by demodulating the horizontal angle from one or more modulated subcarriers of the modulated initial laser pulse 302.

FIG. 13 shows a method 1300 of operation of a laser transmitter, in accordance with one or more embodiments. Method 1300 may be applied in conjunction with method 1200 of operation of a laser receiver shown in FIG. 12 for determining a position and/or orientation associated with the laser receiver. Method 1300 is passive in that it emits and passively reflects laser pulses, but does not calculate any position. Method 1300 will be described with reference to FIGS. 1-3. In one embodiment, the steps of method 1300 may be performed by laser transmitter 102 of FIG. 1, laser transmitter 210 of FIG. 2B, or laser transmitter 702 of FIGS. 7A and 7B.

At step 1302, an initial laser pulse 302 is continuously projected towards a laser receiver 200 in rotary irradiation. The initial laser pulse 302 may be an N-shaped beam 108 projected by laser sources 212 of laser transmitter 210 in rotary irradiation. In one embodiment, the initial laser pulse 302 is modulated with a plurality of subcarriers to transmit horizontal angle information associated with the laser transmitter, as well as additional data associated with the laser transmitter, to the laser receiver.

At step 1304, a first reflected laser pulse 304 is received and reflected by a reflective surface 214 of laser transmitter 210 to produce a first double reflected laser pulse 306. The first reflected laser pulse 304 is produced as a result of the initial laser pulse 302 reflecting off a first reflective surface (e.g., reflective surface 204-A) of the laser receiver 200.

At step 1306, a second reflected laser pulse 308 is received and reflected by a reflective surface 214 of laser transmitter 210 to produce a second double reflected laser pulse 310. The second reflected laser pulse 308 is produced as a result of the initial laser pulse 302 reflecting off a second reflective surface (e.g., reflective surface 204-B) of the laser receiver 200.

Figure 14:
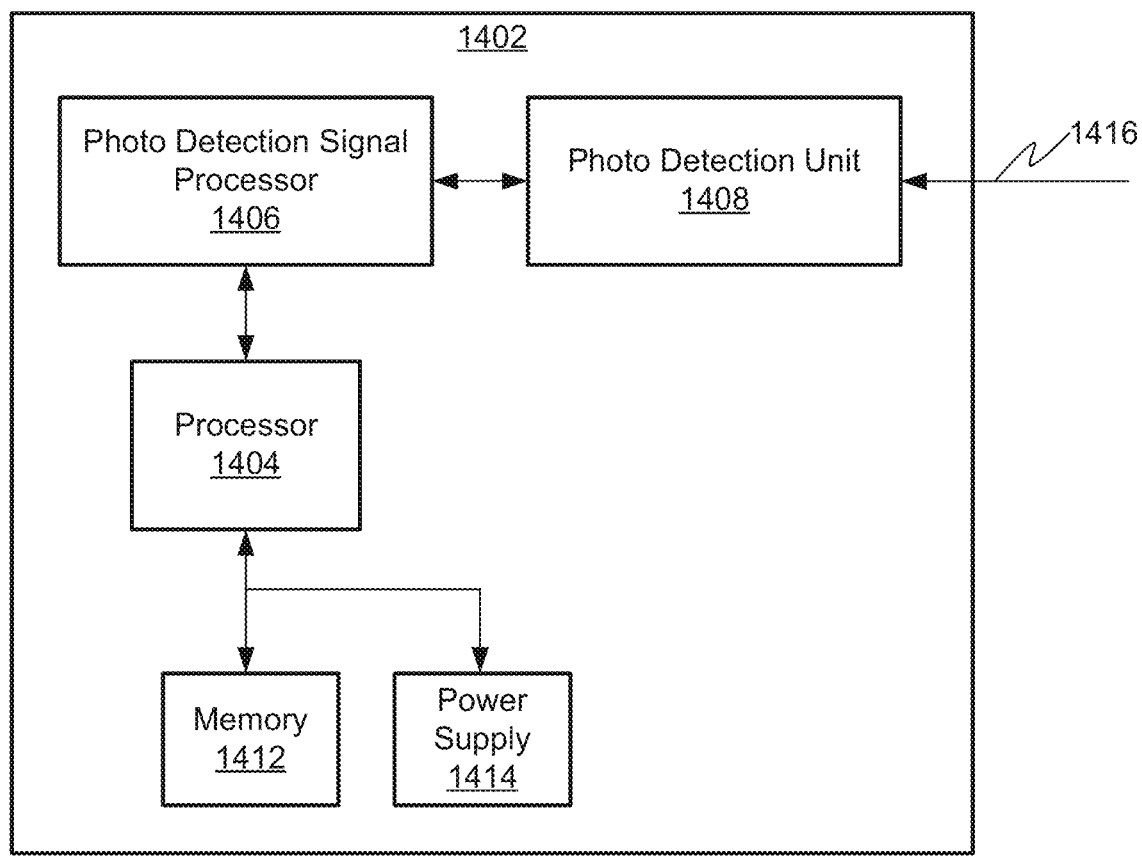
FIG. 14 shows a high level block diagram of an exemplary laser receiver.

FIG. 14 shows a high level block diagram of a laser receiver 1402, in accordance with one or more embodiments. In one embodiment, laser receiver 1402 may be laser receiver 104 of FIG. 1, laser receiver 200 of FIG. 2A, or laser receiver 704 of FIGS. 7A and 7B. It should be understood that FIG. 14 is a high level representation of laser receiver 1402 to generally show functional computing components of laser receiver 1402 for illustrative purposes, and that laser receiver 1402 may be implemented with additional structural or functional components.

Laser receiver 1402 includes photo detection unit 1408 for detecting and receiving one or more laser pulses 1416 (e.g., N-shaped beams 108 in FIG. 1). Photo detection unit 1408 may include, e.g., one or more photo detectors, photo diodes, or any other suitable device. Upon receiving laser pulses 1416, a photo detection signal is provided as input to photo detection signal processor 1406, where it is determined whether or not light has been received by laser receiver 1402. As will be appreciated, any required signal processing such as, e.g., analog-to-digital conversion, may be performed in a well-known manner, and any modulated data superimposed on laser pulses 1416 is extracted and analyzed by photo detection signal processor 1406 in conjunction with processor 1404. Power supply 1414 supplies power to laser receiver 1402 in a well-known fashion. Power supply 1414 may be, for example, a rechargeable battery (e.g., NiMH) or an alkaline battery, or may be powered by an exterior power source, such as, e.g., a construction machine associated with laser receiver 1402. Memory 1412 stores computer program instructions (e.g., code) that when executed by processor 1404 carries out various operations, such as, e.g., steps 1212 and 1214 of method 1200 of FIG. 12 or other operations of various embodiments described herein. One skilled in the art will recognize that an implementation of laser receiver 1402 may have other structures and may contain other components as well, and that FIG. 14 is a high level representation of some of the components of such a laser receiver for illustrative purposes.

Figure 15:
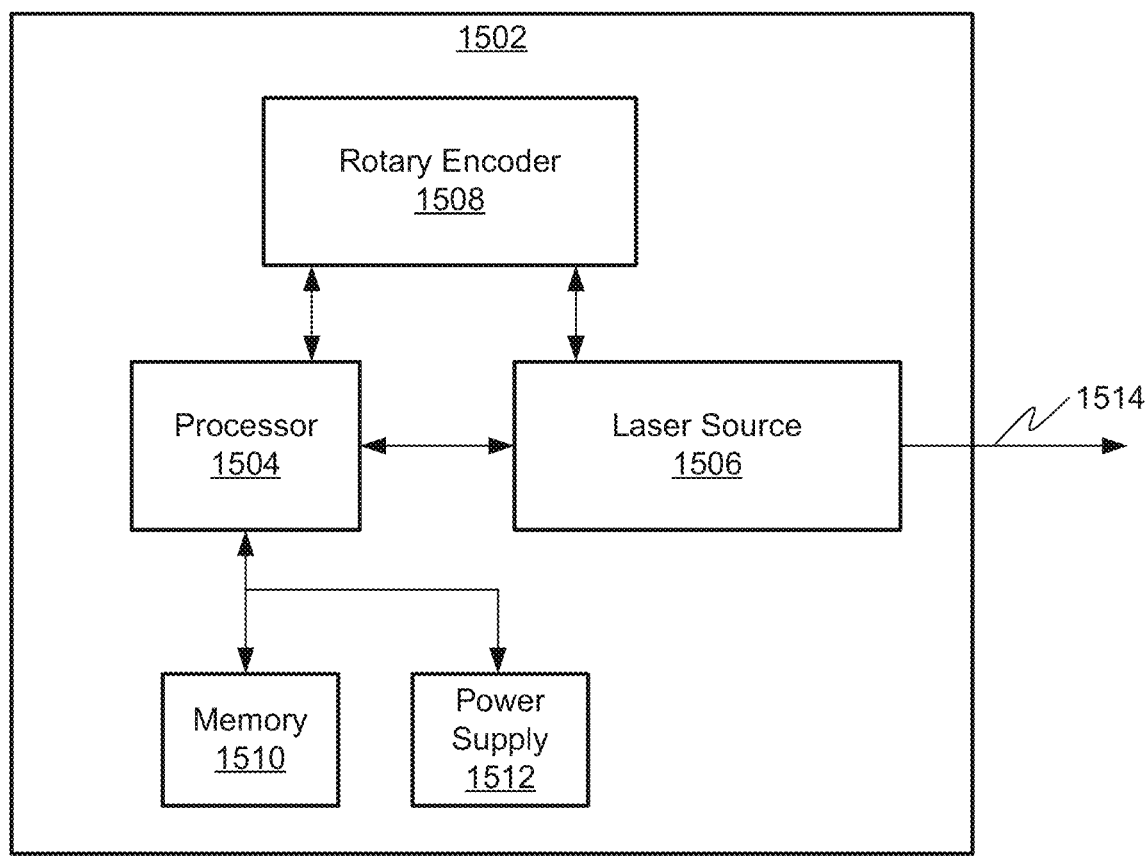
FIG. 15 shows a high level block diagram of an exemplary laser transmitter.

FIG. 15 shows a high level block diagram of a laser transmitter 1502, in accordance with one or more embodiments. In one embodiment, laser transmitter 1502 may be laser transmitter 102 of FIG. 1, laser transmitter 210 of FIG. 2B, or laser transmitter 702 of FIGS. 7A and 7B. It should be understood that FIG. 15 is a high level representation of laser transmitter 1502 to generally show functional computing components of laser transmitter 1502 for illustrative purposes, and that laser transmitter 1502 may be implemented with additional structural or functional components.

Laser transmitter 1502 includes one or more laser sources 1506 for projecting one or more laser pulses 1514 (e.g., N-shaped beams 108 in FIG. 1). Laser transmitter 1502 may modulate data on laser pulses 1514. Rotary encoder 1508 measures the instant angle of the head of laser transmitter 1502. Power supply 1512 supplies power to laser transmitter 1502 in a well-known fashion. Power supply 1512 may be, for example, a rechargeable battery (e.g., NiMH) or an alkaline battery, or may be powered by an exterior power source, such as, e.g., a construction machine associated with laser transmitter 1502. Memory 1510 stores computer program instructions (e.g., code) that when executed by processor 1504 carries out various operations (e.g., modulation). One skilled in the art will recognize that an implementation of laser transmitter 1502 may have other structures and may contain other components as well, and that FIG. 15 is a high level representation of some of the components of such a laser transmitter for illustrative purposes.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 12. Certain steps or functions of the methods and workflows described herein, including one or more of the steps or functions of FIG. 12, may be performed by a server or by another processor in a network-based cloud-computing system. Certain steps or functions of the methods and workflows described herein, including one or more of the steps of FIG. 12, may be performed by a client computer in a network-based cloud computing system. The steps or functions of the methods and workflows described herein, including one or more of the steps of FIG. 12, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

One skilled in the art will recognize that an implementation of laser receiver 1402 of FIG. 14 and laser transmitter 1502 of FIG. 15 may have other structures and may contain other components as well, and that FIGS. 14 and 15 are a high level representation of some of the components of such a laser receiver and laser transmitter for illustrative purposes. For example, laser receiver 1402 and laser transmitter 1502 may also include one or more network interfaces for communicating with other devices via a network and one or more input/output devices that enable user interaction with other computers or systems (e.g., display, keyboard, mouse, speakers, buttons, etc.). Such input/output devices may include peripherals, such as a printer, scanner, display screen, etc. For example, input/output devices may include a display device such as a cathode ray tube (CRT) or liquid crystal display (LCD) monitor for displaying information to the user, a keyboard, and a pointing device such as a mouse or a trackball by which the user can provide input.

Processors 1404 and 1504 may include both general and special purpose microprocessors, and may be the sole processor or one of multiple processors. Processors 1404 and 1504 may include one or more central processing units (CPUs), for example. Processors 1404 and 1504 and/or memories 1412 and 1510 may include, be supplemented by, or incorporated in, one or more application-specific integrated circuits (ASICs) and/or one or more field programmable gate arrays (FPGAs).

Memories 1412 and 1510 each include a tangible non-transitory computer readable storage medium, and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of a laser receiver, comprising:
receiving and reflecting an initial laser pulse from a laser transmitter by a first reflective surface of the laser receiver to produce a first reflected laser pulse;
detecting a first double reflected laser pulse at a photo detection unit of the laser receiver, the first double reflected laser pulse produced as a result of the first reflected laser pulse reflecting off a reflective surface of the laser transmitter;
receiving and reflecting the initial laser pulse by a second reflective surface of the laser receiver to produce a second reflected laser pulse;
detecting a second double reflected laser pulse at the photo detection unit of the laser receiver, the second double reflected laser pulse produced as a result of the second reflected laser pulse reflecting off the reflective surface of the laser transmitter; and determining an azimuth angle associated with the laser receiver based on the first double reflected laser pulse and the second double reflected laser pulse.

2. The method of claim 1, wherein determining an azimuth angle associated with the laser receiver based on the first double reflected laser pulse and the second double reflected laser pulse comprises:

determining a phase difference between the first double reflected laser pulse and the second double reflected laser pulse.

3. The method of claim 1, further comprising:

detecting the initial laser pulse at the photo detection unit of the laser receiver, wherein the initial laser pulse is received and reflected by the first reflective surface of the laser receiver prior to the photo detection unit detecting the initial laser pulse, and the initial laser pulse is received and reflected by the second reflective surface of the laser receiver after the photo detection unit detects the initial laser pulse.

4. The method of claim 1, wherein the initial laser pulse from the laser transmitter is modulated with a plurality of modulated subcarriers with interlocked phases by the laser transmitter to transmit a horizontal angle associated with the laser receiver.

5. The method of claim 4, further comprising:

demodulating the modulated initial laser pulse to extract the horizontal angle by multiplying phases of the plurality of modulated subcarriers to orthogonal vectors.

6. The method of claim 4, wherein the initial laser pulse from the laser transmitter is modulated with the plurality of modulated subcarriers by the laser transmitter to transmit additional data associated with the laser transmitter.

7. The method of claim 1, further comprising:

determining one or more orientation angles using a tilt sensor.

8. A laser receiver, comprising:

a photo detection unit; and at least one reflective surface each having a center point positioned to be offset from a center point of the photo detection unit.

9. The laser receiver of claim 8, wherein the at least one reflective surface comprises a first reflective surface and a second reflective surface positioned on opposite sides of a plane intersecting a center of the photo detection unit.

10. The laser receiver of claim 9, wherein the first reflective surface and the second reflective surface are symmetrically positioned with respect to the plane.

11. The laser receiver of claim 9, wherein the plane is normal to a surface of the photo detection unit.

12. The laser receiver of claim 8, further comprising:

a non-reflective area positioned around the photo detection unit.

13. The laser receiver of claim 12, wherein the photo detection unit is for detecting an initial laser pulse from a laser transmitter and a size of the non-reflective area is at least twice a size of a reflective surface of the laser transmitter.

14. The laser receiver of claim 8, further comprising:

a sensor for determining one or more orientation angles.

15. A method of operation of a laser transmitter, comprising:

projecting an initial laser pulse towards a laser receiver modulated with an instant angle of laser rotation;

receiving and reflecting a first reflected laser pulse by a reflective surface of the laser transmitter to produce a first double reflected laser pulse; and receiving and reflecting a second reflected laser pulse by the reflective surface of the laser transmitter to produce a second double reflected laser pulse, wherein the first reflected laser pulse and the second reflected laser pulse are produced as a result of the initial laser pulse reflecting off a first reflective surface and a second reflective surface respectively of the laser receiver.

16. The method of claim 15, wherein projecting an initial laser pulse towards a laser receiver comprises:

modulating the initial laser pulse with a plurality of modulated subcarriers by the laser transmitter to transmit a horizontal angle associated with the laser transmitter.

17. The method of claim 16, wherein modulating the initial laser pulse with a plurality of modulated subcarriers by the laser transmitter to transmit a horizontal angle associated with the laser transmitter comprises:

modulating the initial laser pulse with the plurality of modulated subcarriers to transmit additional data associated with the laser transmitter.

18. The method of claim 15, wherein the laser transmitter comprises a non-reflective area positioned around one or more laser sources, the non-reflective area being at least twice a size of reflective surfaces on the laser receiver.

19. A laser measuring system, comprising:

a laser transmitter comprising:

one or more laser sources for projecting an initial laser pulse, and a reflective surface; and a laser receiver comprising:

a first reflective surface for reflecting the initial laser pulse to the laser transmitter to provide a first reflected laser pulse, a second reflective surface for reflecting the initial laser pulse to the laser transmitter to provide a second reflected laser pulse, a photo detection unit for detecting 1) a first double reflected laser pulse produced by the first reflected laser pulse reflecting off the reflective surface of the laser transmitter, and 2) a second double reflected laser pulse produced by the second reflected laser pulse reflecting off the reflective surface of the laser transmitter, a processor, and a memory to store computer program instructions, the computer program instructions when executed on the processor cause the processor to perform operations comprising:

determining an azimuth angle associated with the laser receiver based on the first double reflected laser pulse and the second double reflected laser pulse.

20. A method, comprising:

projecting an initial laser pulse by a laser transmitter towards a laser receiver;

receiving and reflecting the initial laser pulse by a first reflective surface of the laser receiver to produce a first reflected laser pulse;

receiving and reflecting the first reflected laser pulse by a reflective surface of the laser transmitter to produce a first double reflected laser pulse;

detecting the first double reflected laser pulse at a photo detection unit of the laser receiver;

receiving and reflecting the initial laser pulse by a second reflective surface of the laser receiver to produce a second reflected laser pulse;

receiving and reflecting the second reflected laser pulse by the reflective surface of the laser transmitter to produce a second double reflected laser pulse, detecting the second double reflected laser pulse at the photo detection unit of the laser receiver; and determining an azimuth angle associated with the laser receiver based on the first double reflected laser pulse and the second double reflected laser pulse.

21. The method of claim 20, wherein determining an azimuth angle associated with the laser receiver based on the first double reflected laser pulse and the second double reflected laser pulse comprises:

determining a phase difference between the first double reflected laser pulse and the second double reflected laser pulse.

22. A method, comprising:

transmitting a signal modulated with a plurality of subcarriers with interlocked phases towards a receiver, at least one of the plurality of subcarriers carrying data; and demodulating the modulated signal by multiplying phases of the plurality of subcarriers to orthogonal vectors.

23. The method of claim 22, wherein the signal is a laser pulse.

24. The method of claim 22, wherein the signal is a radio frequency signal.

* * * * *